(12) United States Patent
Tregoning

(10) Patent No.: US 6,667,469 B2
(45) Date of Patent: Dec. 23, 2003

(54) DIRECT GEAR DRIVEN CARRIAGE ASSEMBLY FOR AN IMAGING SYSTEM

(75) Inventor: Michael A. Tregoning, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/898,608

(22) Filed: Jul. 3, 2001

(65) Prior Publication Data
US 2003/0006361 A1 Jan. 9, 2003

(51) Int. Cl.$^7$ ............................................. H01L 27/00
(52) U.S. Cl. ..................... 250/208.1; 250/239; 358/497
(58) Field of Search ........................... 250/208.1, 234, 250/235, 236, 239, 216; 358/497, 494, 483, 482, 474; 382/312; 399/211, 202, 32, 36

(56) References Cited

U.S. PATENT DOCUMENTS

| 4,129,374 A | | 12/1978 | Uchida et al. | |
|---|---|---|---|---|
| 4,794,427 A | * | 12/1988 | Shirai et al. | 355/49 |
| 5,331,624 A | | 7/1994 | Park | |
| 6,072,602 A | * | 6/2000 | Sun et al. | 358/497 |
| 6,246,492 B1 | * | 6/2001 | Chang et al. | 358/497 |
| 6,330,084 B1 | * | 12/2001 | Chiang | 358/497 |
| 6,473,206 B1 | * | 10/2002 | Fujimoto et al. | 358/497 |

FOREIGN PATENT DOCUMENTS

| DE | 3638911 A | 5/1988 |
|---|---|---|
| GB | 2159292 A | 11/1985 |
| JP | 62267716 A | 11/1987 |
| JP | 6082924 A | 3/1994 |
| JP | 7184002 A | 7/1995 |

* cited by examiner

*Primary Examiner*—Kevin Pyo
*Assistant Examiner*—Seung C. Sohn

(57) ABSTRACT

A media imaging system comprising a scanner operable to scan an image on a media, a rail having slots disposed within the scanner, a carriage disposed within the scanner and having a motor gear assembly comprising a drive motor that generates a rotational force to a shaft connected to a gear having teeth that are engageable with the slots of the rail is provided. A carriage for an imaging system comprising a carriage body and a motor gear assembly comprising a drive motor that generates a rotational force to a shaft connected to a gear is provided. A method of imaging an object in an imaging system comprising rotating a shaft by a motor coupled thereto, imparting a force on the carriage by meshing a gear coupled to the shaft with a slotted rail, and translating the carriage through a carriage path by imparting of the force is provided.

15 Claims, 2 Drawing Sheets

DIRECT GEAR DRIVEN CARRIAGE ASSEMBLY FOR AN IMAGING SYSTEM

TECHNICAL FIELD OF THE INVENTION

This invention relates to carriage drive systems for imaging devices and, more particularly, to a system and method of driving a carriage with a direct gear drive in an imaging system.

BACKGROUND OF THE INVENTION

In various imaging systems, such as media scanning systems, a carriage is moved relative to a media to generate an image of the media. For example, in a document scanning system the carriage carries an optic system and a photosensitive device which detects ink markings or characters on the media as the carriage moves relative to the media and converts light reflected off the media, or alternatively light that passes therethrough, to electric charges. To achieve accurate scanning, it is important to maintain an accurate positional relationship between the carriage and the media.

Conventional techniques for driving a carriage utilize a belt drive assembly. Many configurations of belt drive assemblies exist but all commonly include a rubber drive belt for imparting a translational motion to the carriage along a carriage path. Belt drive assemblies are susceptible to vibrations and fatigue. Vibrations in the belt drive assembly result in errors in printing or scanning. Fatigue in the belt may ultimately result in failure of the belt drive assembly.

SUMMARY OF THE INVENTION

In accordance with an embodiment of the present invention, a media imaging system comprising a scanner operable to scan an image on a media, a rail having slots along the length thereof and disposed within the scanner, a carriage disposed within the scanner, and a motor gear assembly coupled to the carriage comprising a drive motor that generates a rotational force to a shaft connected to a gear having teeth that are engageable with the slots of the rail is provided.

In another embodiment of the present invention, a carriage for an imaging system comprising a carriage body and a motor gear assembly comprising a drive motor that generates a rotational force to a shaft connected to a gear is provided.

In another embodiment of the invention, a method of imaging an object in an imaging system comprising rotating a shaft by a motor coupled thereto, imparting a force on the carriage by meshing a gear coupled to the shaft with a slotted rail, and translating the carriage through a carriage path by imparting of the force is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

The preferred embodiment of the present invention and its advantages are best understood by referring to FIGS. 1 through 4 of the drawings, like numerals being used for like and corresponding parts of the various drawings.

Figure 1A:
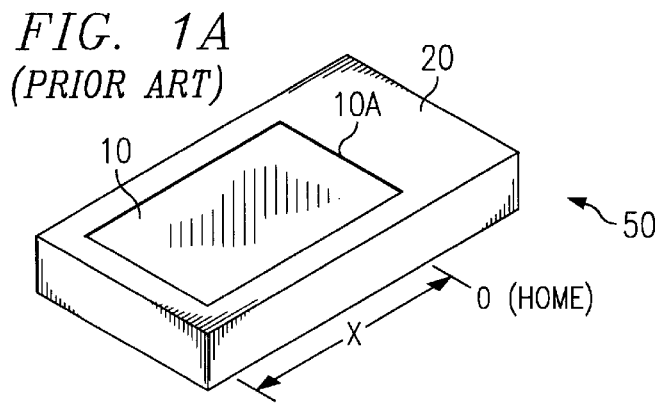
FIGS. 1A and 1B are perspective views of a media imaging system having a carriage as is known in the art.
Figure 1B:
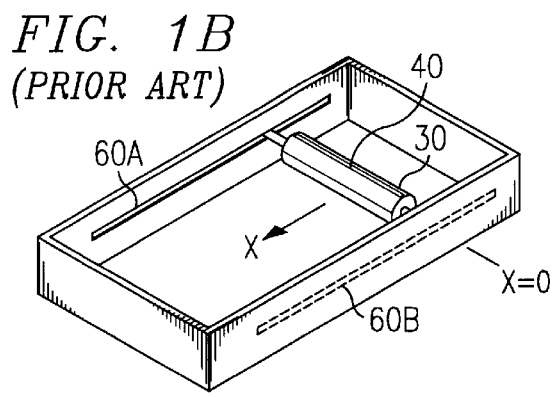

Referring to FIGS. 1A and 1B, there is respectively illustrated a perspective view of a reflective media scanner 50 and a perspective view of media scanner 50 having a top surface 20 removed as is known in the art. Media scanner 50 comprises a transparent platen 10 on which a document, or other media, to be scanned is placed. Media scanner 50 may be connected to a computer for facilitating control thereof.

A lamp 40 located within scanner 50 radiates light that passes through platen 10 and is reflected off a media placed on platen 10. The reflected light is collected by an internal optic system (not shown) and directed onto a photosensitive device (not shown) where the reflected light is converted into one or more electric signals. A carriage 30 in scanner 50 may support one or more scanner devices or subsystems, such as lamp 40, an optic system and a photosensitive device or array. Carriage 30 may have a home position (X=0) from which scan operations are initiated. The carriage home position will generally correspond to a leading edge 10A of platen 10. As light is radiated from lamp 40, carriage 30 moves through a translation distance (X), or carriage path, along one or more support rails 60A and 60B. One or more photosensitive devices convert light collected by an optic system carried on the carriage as the carriage moves through the carriage path.

Figure 2A:
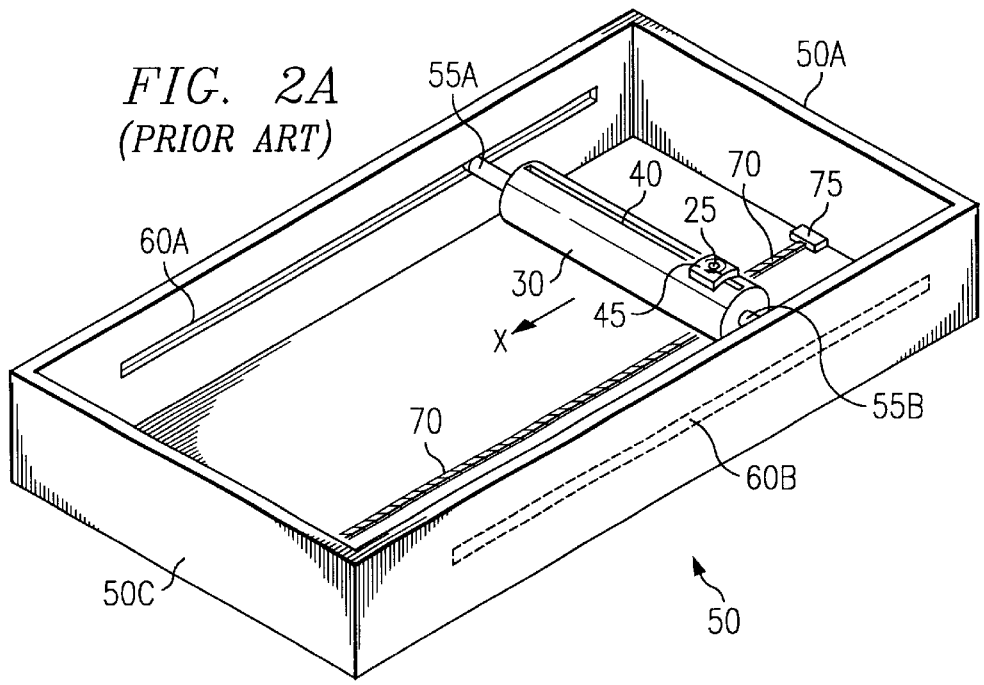
FIGS. 2A and 2B are, respectively, a perspective view of a scanner system having a belt drive carriage and a top view of the belt drive assembly as is known in the art.
Figure 2B:
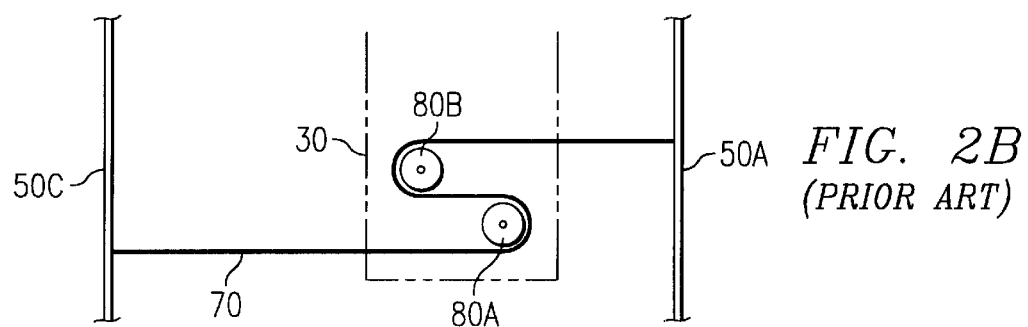

In FIGS. 2A and 2B, there is illustrated a typical prior art carriage belt drive assembly utilized for imparting a translational motion to carriage 30 as is known in the art. A belt 70 is connected at opposing ends thereof to respective internal surfaces, or another structure, of scanner 50, for example at mount 75 attached to wall 50A and a similar structure attached to wall 50C. Carriage 30 has one or more wheels 80A and 80B connected thereto. A shaft 25 couples a reversible motor 45 to wheel 80B. Accordingly, motor 45 may impart a rotational motion to shaft 25 that rotates wheel 80B. Wheel 80B engages with belt 70 and, when rotated, imparts a translational motion to carriage 30 and drives carriage 30 along either direction of a carriage path (X). Carriage 30 may comprise one or more support structures 55A and 55B that slideably connect carriage 30 to rails 60A and 60B. As wheel 80B is rotated and engaged with belt 70, a translational motion is imparted to carriage 30 and the slideable connections between support structures 55A and 55B with rails 60A and 60B stabilize the translation of carriage 30 along either direction of the carriage path.

However, belt 70 may be subject to vibrations that can adversely affect the scan quality of scanner 50. Furthermore, belt 70 may experience fatigue effects that, over time, can result in belt deformations that result in a loss of scan quality. Belt fatigue may ultimately result in structural failure of belt 70 and a complete loss of scanner 50 operability. The present invention provides a direct carriage gear drive assembly not subject to the aforementioned deficiencies commonly found in carriage belt drive assemblies.

Figure 3:
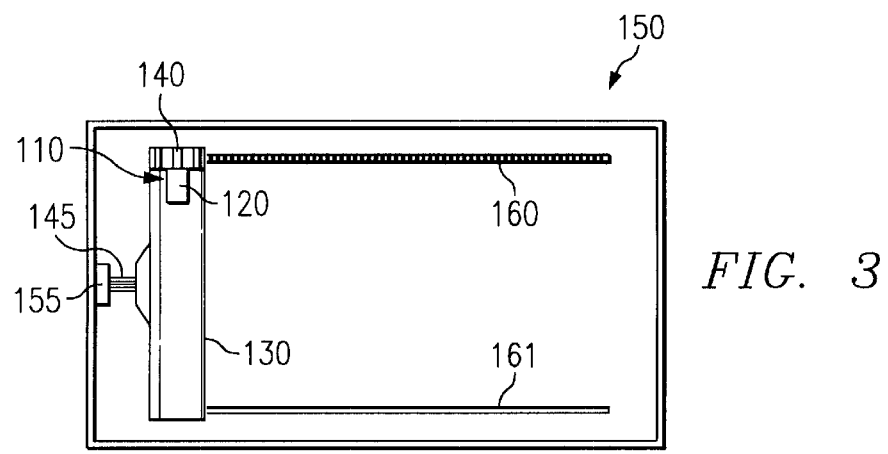
FIG. 3 is a top sectional view of an scanner having a direct gear driven carriage according to an embodiment of the invention.

The present invention will now be described in conjunction with a carriage drive assembly of a scanner system. Description of the invention implemented in a scanner system is exemplary only and a scanner system is chosen only to facilitate understanding of the invention. The present invention may find application in numerous imaging systems, such as fax machines, copiers, printers and other devices. In FIG. 3, there is illustrated a simplified top sectional view of a scanner 150 comprising a direct gear driven carriage assembly according to the teachings of the invention. A carriage 130 comprises a motor gear assembly 110. Motor gear assembly 110 comprises a reversible motor 120 and a toothed gear 140. Motor 120 and toothed gear 140 are connected by a shaft. Toothed gear 140 is meshably engageable with slotted rail 160. A translational force is imparted on carriage 130 when toothed gear 140 is rotated and results in motion of carriage 130 along a carriage path (X). A mount structure (not shown) may slideably connect carriage 130 to non-slotted rail 161 at an end of carriage 130.

Figure 4:
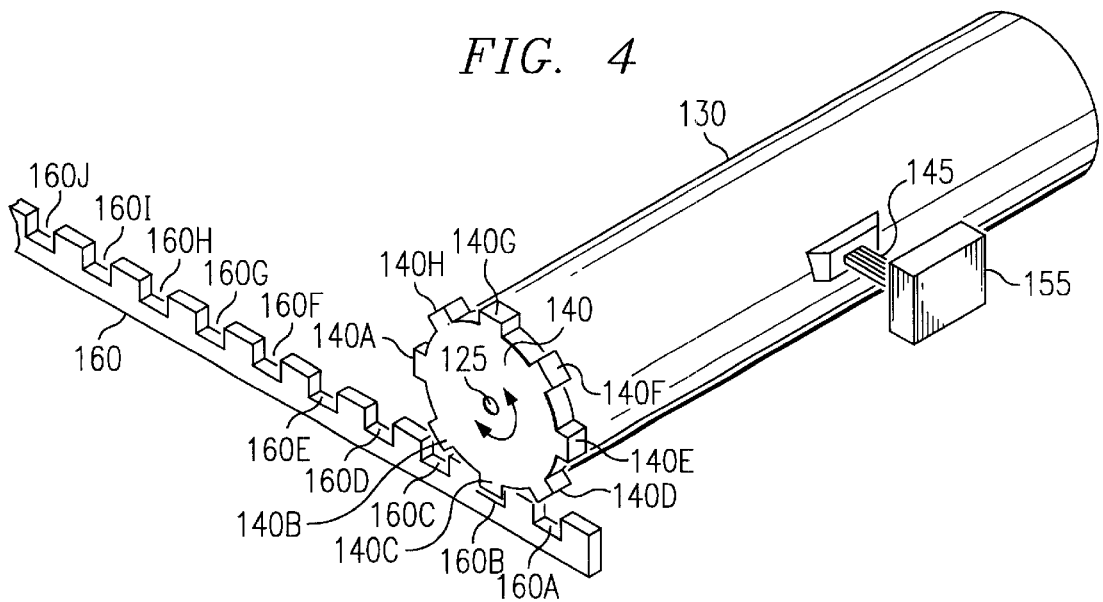
FIG. 4 is a side view of the gear engaged with a rail for imparting a translational motion to a carriage according to an embodiment of the invention.

In FIG. 4, there is illustrated a side view of toothed gear 140 engaged with a section of slotted rail 160 according to the teachings of the invention. Motor gear assembly 110 is connected to carriage 130. A shaft 125 connects reversible motor 120 with toothed gear 140 and is operable to transfer a rotational force therebetween. Toothed gear 140 comprises a plurality of teeth 140A–140H each engageable with a slot 160A–160J of slotted rail 160. Toothed gear 140 imparts a translational motion to carriage 130 when rotated and drives carriage 130 along either direction of a carriage path defined by the respective longitudinal axis of rails 160 and 161. Carriage 130 may comprise one or more support structures that slideably connect carriage 130 to non-slotted rail 161. As gear 140 is rotated and engaged with slotted rail 160, a translational motion is imparted to carriage 130 and the slideable connections between a support structure and rail 161 may stabilize the translation of carriage 130 along either direction of the carriage path. A cable 145 connects carriage 130 with a power source 155 for providing an electromotive force to motor drive assembly 110. Slotted rail 160 and toothed gear 140 may be manufactured from a metallic or plastic material thus reducing or eliminating structural fatigue thereof.

Carriage 130 may support one or more devices or subsystems. For example, carriage 130 may be substituted for carriage 30 and the belt drive assembly respectively described with reference to FIGS. 1 and 2A–2B for implementation of a scanning system having a direct gear driven carriage assembly. Accordingly, carriage 130 may further comprise an optic system, one or more photosensitive devices, and/or a lamp. Carriage 130 may be utilized in other imaging systems as well.

As described, a direct carriage gear drive assembly comprising a motor and a toothed gear is provided. The toothed gear is engageable with a slotted rail. Rotation of the toothed gear by the motor imparts a translational motion on the carriage and directs it along a carriage path. The slotted rail and the toothed gear may be fabricated from metal or other materials such as resins and are accordingly resistant to structural fatigue and failure.

What is claimed is:

1. A media imaging system, comprising:
    a scanner operable to scan an image on a media;
    a first rail disposed within the scanner;
    a carriage disposed within the scanner, the rail first disposed adjacent to a first end of the carriage, the carriage having a motor located thereon for rotationally driving a gear of the carriage to meshably engage the gear with the first rail; and
    a second rail disposed adjacent to a second end of the carriage opposite the first end, the second end of the carriage slideably connected to the second rail.

2. The media imaging system according to claim 1, wherein the first and second rails are comprised of a material selected from the group consisting of metal and resin.

3. The media imaging system according to claim 1, wherein the gear is comprised of a material selected from the group consisting of metal and resin.

4. The media imaging system according to claim 1, wherein the carriage supports an optics system, a photosensitive device, and a lamp.

5. The media imaging system according to claim 4, wherein the lamp radiates light as the gear is driven by the motor, the optics system operable to collect light reflected from an object having the radiated light reflected therefrom, the photosensitive device operable to convert the collected light into electric signals.

6. A carriage for an imaging system, comprising:
    a carriage body adapted to provide a slideable connection at an end of the carriage with a first carriage body support rail; and
    a motor connected with a gear located at an end of the carriage opposing the slideable connection, the gear meshably engaged with a second carriage body support rail.

7. The carriage according to claim 6, wherein the carriage supports an optic system and a photosensitive device.

8. A method of imaging an object in an imaging system, comprising:
    supporting a carriage by first and second rails located at opposing ends of the carriage, the carriage slideably connected to the first rail;
    driving a gear of the carriage by a motor located on the carriage, the gear meshably engaged with the second rail; and
    translating the carriage through a carriage path by engagement of the gear with the second rail.

9. The method according to claim 8, further comprising collecting light by an optic system disposed on the carriage, the light collected during translation of the carriage through the carriage path.

10. The method according to claim 9, further comprising converting the collected light into electric signals by a photosensitive device disposed on the carriage.

11. The method according to claim 8, further comprising radiating light from a lamp disposed on the carriage, the lamp radiating light during translation of the carriage through the carriage path.

12. A media imaging system, comprising:
   a scanner operable to scan an image on a media;
   a carriage disposed within the scanner having a gear located thereon;
   a first rail adapted to support a first end of the carriage, the first rail adapted to meshably engage the gear; and
   a second rail adapted to support a second end of the carriage opposite the first end, the second end of the carriage adapted to slideably engage the second rail.

13. The system according to claim 12, further comprising a motor located on the carriage adapted to rotate the gear.

14. A method of imaging a media, comprising:
   slideably supporting a first end of a carriage with a first rail;
   meshably engaging a gear of the carriage with a second rail, the second rail supporting a second end of the carriage opposite the first end;
   driving the carriage through a carriage path by rotationally driving the gear; and
   scanning a media during translation of the carriage.

15. The method according to claim 14, wherein driving the carriage further comprises driving the carriage by rotationally driving the gear with a motor located on the carriage.

* * * * *